United States Patent [19]
Kilmer

[11] 3,737,695
[45] June 5, 1973

[54] SHADED POLE SYNCHRONOUS MOTOR

[75] Inventor: Bill G. Kilmer, Indianapolis, Ind.

[73] Assignee: P. R. Mallory & Co., Inc., Indianapolis, Ind.

[22] Filed: Sept. 23, 1971

[21] Appl. No.: 183,211

[52] U.S. Cl. .................310/162, 310/164, 310/172
[51] Int. Cl. ..........................................H02k 19/14
[58] Field of Search ....................310/156, 162–164, 310/172, 41

[56] References Cited
UNITED STATES PATENTS

| | | | |
|---|---|---|---|
| 2,981,855 | 4/1961 | Van Lieshout et al. | 310/172 X |
| 3,014,141 | 12/1961 | Riggs | 310/164 X |
| 2,665,389 | 1/1954 | Landgraf et al. | 310/164 |

Primary Examiner—D. F. Duggan
Attorney—Richard H. Childress

[57] ABSTRACT

Shading means are disposed against each end plate of a stator field structure, the shading means covering substantially the field plate's entire surface and providing a magnetic path completely around a predetermined number of poles of each end plate, the predetermined number of poles being less than the number of poles in each plate.

5 Claims, 3 Drawing Figures

PATENTED JUN 5 1973 3,737,695

SHADED POLE SYNCHRONOUS MOTOR

The present invention relates to a synchronous motor and, more particularly, to a synchronous motor having shaded poles to provide a magnetic one-way directional system for the motor.

There are a multitude of applications for small synchronous motors of the type having a permanent magnet rotor. Many of these appliqations are in timing devices such as clocks and appliances using sequence switches such as automatic washers.

One of the problems associated with synchronous motors having permanent magnet rotors, is that the rotors will run in either a clockwise or a counterclockwise direction when current is applied. Thus, the motor drive shaft could be driven in a direction counter to what is desired.

One way of solving this problem is to reverse the direction of the rotor's rotation when the motor is started in the wrong direction by some sort of mechanical means. While such systems may be satisfactory, they do not really solve the problem of the wrong directional start. It would be far better to insure that the motor would always start in the right direction. This may be accomplished by using what has become known in the art as a magnetic directional system, which includes a shading means applied to a particlar pole or poles of the stator structure. While such systems appear to be, for the most part, entirely satisfactory, it has been found that they still have a limitation in that they appear to be voltage sensitive. That is, it has been found that such systems will only insure a correct directional rotation within a voltage range as determined by the motor's characteristics.

According to the present invention, it has been found that the operable voltage range for synchronous motors employing a magnetic directional starting system of a shadinmeans for the stator structure can be increased if the shading means covers substantially the entire area of the field plates making up the stator structure.

Accordingly, it is an object of the present invention to provide a synchronous motor having a magnetic directional system which will insure that the rotor of the motor will start in a predetermined direction.

Another object of the invention is to provide a synchronous motor having a magnetic directional starting system which includes a shading means associated with the stator structure to insure that the motor will start in the same direction.

Still another object of the invention is to provide a synchronous motor having a magnetic directional starting system which is operable over a relatively wide voltage range.

Yet another object of the invention is to provide a synchronours motor having a magnetic direction system including a shading means which substantially covers the entire surface area of the field plates making up the stator structure.

These and other objects of the invention will become apparent from the following description taken in conjunction with the accompanying drawings wherein.

Figure 1:
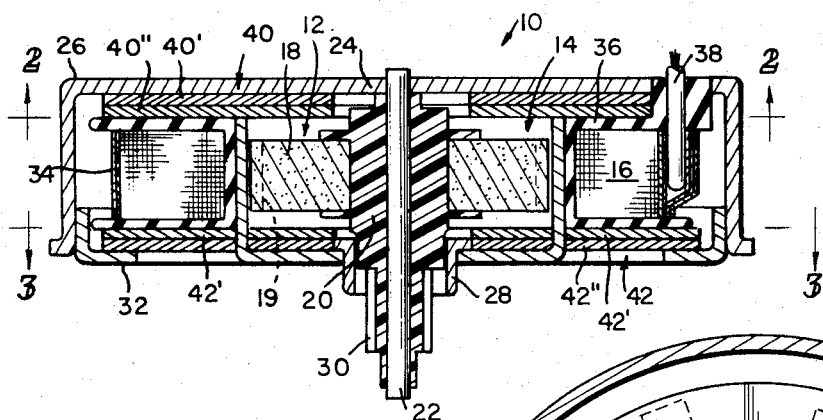
FIG. 1 is a sectional view of a synchronous motor employing the principles of the invention.

Generally speaking, the objects of the invention are accomplished by providing a shaded pole synchronous motor which, in general, comprises a stator structure including a circle of intermeshed stator poles extending from opposed end plates, an energizing winding for the stator structure for connection to a source of alternating current, a permanent magnet rotor having a plurality of equally spaced permanent poles of opposite polarity and rotatable within the circle of intermeshed stator poles by an alternating magnetic field from the stator poles, and shading disc means disposed against each of the end plates and covering substantially their entire surface area and providing a magnetic path completely around a predetermined number of poles of each of the end plates, the predetermined number of poles being less than the number of poles of each plate.

Referring now to the drawings, the synchronous motor 10 of the present invention generally includes a rotor 12, a stator structure 14 and a winding 16 which applies a magnetic field to the stator structure.

Rotor 12 includes a permanent magnet disc 18 in the shape of a ring and carried by a hub 20 which freely rotates on shaft 22. Shaft 22 is fixedly staked to the bottom 24 of cup-shaped member 26. The permanent magnet disc includes a material of a relatively high energy product partial oriented ceramic, such as a barium ferrite ceramic magnet with its outer periphery being impressed or magnetized into separate pole segments 19 of alternate north and south polarity. Alternatively, salient poles carried by a separate hub could surround the ring. Hub 20 freely rotates within sleeve 28. The hub includes a pinion 30 which provides the output means of the motor. Stator structure 14 includes cup-shaped member 26 which is closed by bottom plate 32 and poles 26' and 32' which are lanced from the cup-shaped member and the bottom plate respectively. As more clearly shown in FIG. 2, the poles are intermeshed together to form a circle, the circle and the outer rim of the cup-shaped member forming an annulus in which the winding 16 is disposed. The cup-shaped member and the bottom plate 32 may be fabricated from ordinary cold-rolled steel so that magnetic fields may be readily induced in the stator structure.

The winding 16 includes a coil encased in a cover or jacekt 34 and carried by a bottin 36. Electrical leads 38 may connect the winding to an alternating current power source.

With the motor described thus far, application of an alternating current to the winding 16 produces a magnetic field in the stator structure which in turn causes rotor 12 to rotate. However, with the arrangement described thus far, the rotor will indiscriminately rotate in either a clockwise or a counterclockwise direction. In accordance with the present invention, a rotational start in a desired direction is insured by the use of shading bar means 40 and 42 disposed against and adjacent bottom field plate 32 and the bottom portion of cup-shaped member 26, 24 which also serves as a field plate.

Figure 2:
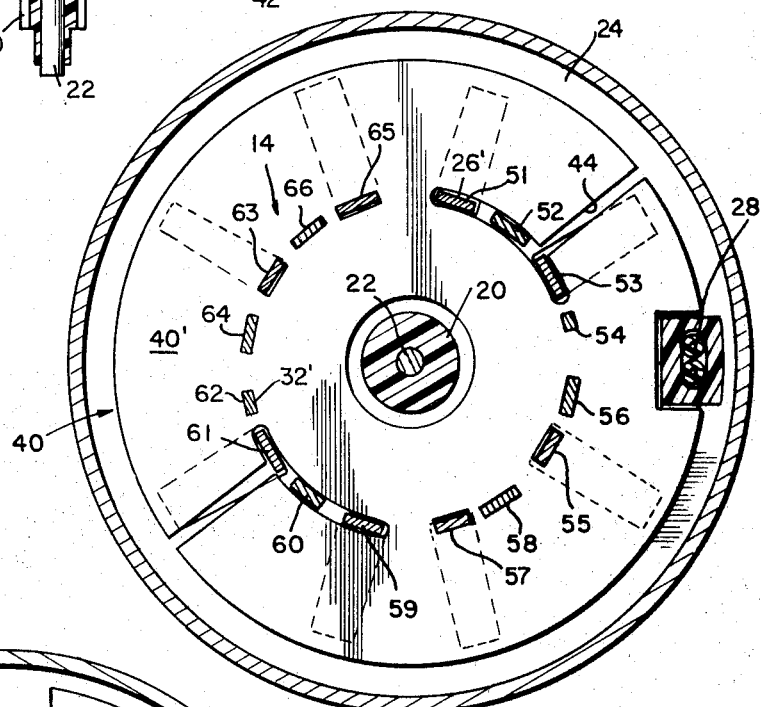
FIG. 2 is a view taken along the line 2—2 of FIG. 1.
Figure 3:
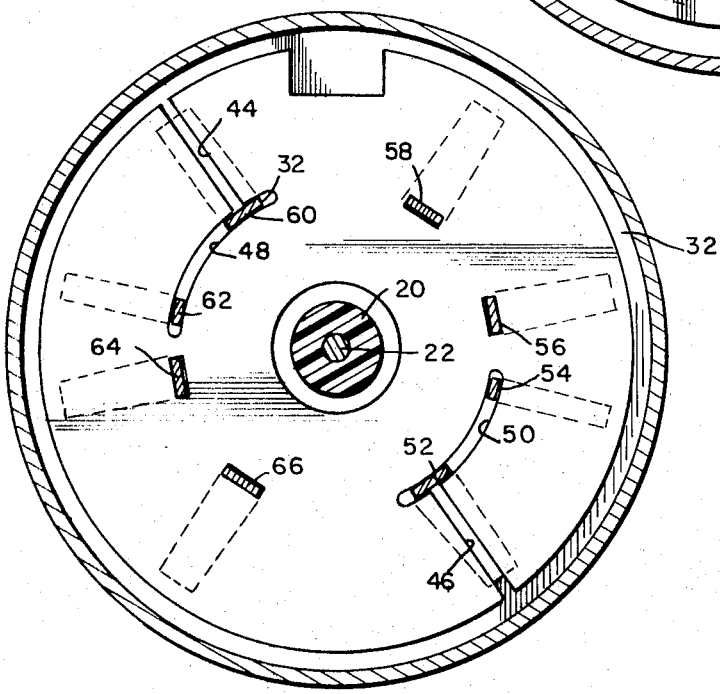
FIG. 3 is a view taken along the line 3—3 of FIG. 1.

Shading means 40 and 42 each include a pair of shading discs 40', 40" and 32', 42". The discs overlie each other and cover substantially the entire surface area of end plate 32 and the end plate formed by the bottom 24 of cup-shaped member 26. The shading discs are composed of a non-magnetic material having a special property of incorporating a change of potential throughout the disc which causes a flow of electrical current (eddy currents) when exposed to a magnetic field. A suitable material, for example, would be copper. By using this material and by shading or providing a magnetic path completely around predetermined numbers of stator poles, the rotor will start in a predetermined direction. And, by covering substantially the entire surface area of the end plates, it has been found that the operable voltage range within which a predetermined start can be assured may be increased. Referring particularly to FIGS. 2 and 3, the odd numbered poles 51-65 are the poles 26' of cup-shaped member 26, while the even numbered poles 52-66 are the poles 32' of plate 32. Diametrically opposed pairs of poles 56-58 and 64-66, of the poles extending from the cup-shaped member 26 are shaded or a magnetic path is provided completely around them through the shading bars. For the poles extending from the end plate 32 diametrically opposed poles 55-57 and, 63-65 are shaded. The remaining poles of end plate 32 remain unshaded. The remaining poles of end palte 32 remain unshaded by providing slits 44 and 46 provided in the two shading bars 42' and 42" which extend from diametrically opposed unshaded poles to the edge of the shading discs, and through slits 48 and 50 of shading discs 42' and 42" which connect the radial slits 44 and 46 to the remaining poles. As shown, identical slits are provided in shading discs 40' and 40".

With the particular configuration shown, rotor 12 will always start and turn in a clockwise direction within a voltage range of ±30 percent from the mean or design voltage of the motor.

The narrow poles 9 and 10 also aid in the starting of the motor.

Because of the symmetry of the system, the direction of rotation can be changed by changing the field plate 32 to one which is the mirror image to the other, the stator poles of the cup-shaped member being symmetrical. Then corresponding poles of the mirror image would be shaded.

What is claimed is:

1. A shaded pole, synchronous motor comprising: a stator structure including a circle of intermeshed stator poles extending from opposed end plates, an energizing winding for said stator structure for connection to a source of alternating current, a permanent magnet rotor having a plurality of equally spaced permanent magnet poles of opposite polarities and rotatable within said circle of intermeshed stator poles by an alternating magnetic field from said stator poles, and shading discs disposed against each of said end plates and covering substantially their entire area and providing a magnetic path completely around two pairs of diametrically opposed poles in each plate and having diametrically opposed slits extending from diametrically opposed poles which are not completely surrounded by a magnetic path to an outer edge of said shading disc, and slits connected to said diametrically opposed slits and surrounding any remaining poles of said stator structure.

2. A shaded pole synchronous motor according to claim 1 wherein there are two of said discs overlying each other for each of said field plates.

3. A shaded pole synchronous motor according to claim 1 wherein said field plates are circular.

4. A shaded pole synchronous motor according to claim 3 wherein one of said field plates is provided from a cup-shaped member and the other field plate closes said cup-shaped member.

5. A shaded pole synchronous motor according to claim 1 wherein said winding includes a coil carried by a bobbin and surrounding said stator structure.

* * * * *